(12) United States Patent  
Mori et al.

(10) Patent No.: US 8,210,302 B2
(45) Date of Patent: Jul. 3, 2012

(54) LAYOUT STRUCTURE FOR CANISTER IN VEHICLE

(75) Inventors: Kensuke Mori, Wako (JP); Jun Nakano, Wako (JP); Takehiko Kikuchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/109,082

(22) Filed: May 17, 2011

(65) Prior Publication Data

US 2011/0284307 A1 Nov. 24, 2011

(30) Foreign Application Priority Data

May 20, 2010 (JP) ................................. 2010-116336

(51) Int. Cl.
*B60K 13/04* (2006.01)
(52) U.S. Cl. ........................................ 180/69.4; 123/519
(58) Field of Classification Search .......... 123/518–519, 123/520–522; 280/296
See application file for complete search history.

(56) References Cited

U.S. PATENT DOCUMENTS

| 5,702,125 | A | * | 12/1997 | Nakajima et al. ............. 280/834 |
| 6,167,849 | B1 | * | 1/2001 | Wilson ........................ 123/41.86 |
| 2010/0051369 | A1 | * | 3/2010 | Kuramochi et al. ......... 180/69.4 |

FOREIGN PATENT DOCUMENTS

JP 2596484 1/1997

* cited by examiner

*Primary Examiner* — J. Allen Shriver, II
*Assistant Examiner* — James Triggs
(74) *Attorney, Agent, or Firm* — Squire Sanders (US) LLP

(57) ABSTRACT

A vehicle may include a body frame, an engine body mounted on the body frame, an exhaust pipe connected to a cylinder head of the engine body, and a canister supported to the engine body. The exhaust pipe(s) includes a portion extending along one side surface of a cylinder block of the engine body. The canister is located between the cylinder block and the portion of the exhaust pipe(s) extending along one side surface of the cylinder block.

20 Claims, 12 Drawing Sheets

LAYOUT STRUCTURE FOR CANISTER IN VEHICLE

BACKGROUND

1. Field

Embodiments of the present invention relate to a vehicle having a body frame, an engine body mounted on the body frame, and an improved layout structure for a canister supported to the engine body for purifying an evaporative fuel from the fuel tank.

2. Description of the Related Art

Japanese Patent No. 2596484 (JP '484) describes a motorcycle having a structure such that a bracket is fixed to the front portion of a crankcase of an engine body mounted on a body frame. An exhaust pipe connected to a cylinder head of the engine body extends along the front surface of the cylinder block and further extends rearward, and a canister is located on the front side of the crankcase so as not to interfere with the exhaust pipe and supported through a mount rubber to the bracket.

In the structure disclosed in JP '484 mentioned above, the exhaust pipe is shifted to one side of the engine body in the lateral direction of the body frame, and the canister is shifted to the other side of the engine body in the lateral direction of the body frame in order to avoid the interference between the exhaust pipe and the canister located on the front side of the crankcase. However, in some models of a motorcycle, there is no flexibility in route and layout of exhaust pipes according to the number of exhaust pipes or engine characteristics. In this case, it is desirable to better locate the canister and the exhaust pipe without the mutual influence therebetween.

SUMMARY

An object according to one embodiment of the present invention is to provide a layout structure for a canister in a vehicle that is better located such that the mutual influence of the canister and the exhaust pipe is avoided.

One embodiment of the present invention includes a vehicle having a body frame, and an engine body mounted on the body frame. The engine body includes a crankcase, a cylinder block integral with or joined to the crankcase, and a cylinder head joined to the cylinder block. An exhaust pipe is connected to the cylinder head, the exhaust pipe having a portion extending along one side surface of the cylinder block. The vehicle also includes a fuel tank, and a canister supported to the engine body for purifying an evaporative fuel from the fuel tank. The canister is located between the cylinder block and the portion of the exhaust pipe extending along the one side surface of the cylinder block.

In one embodiment, a support stay for supporting the canister is mounted on the engine body.

In an embodiment, the canister has a flattened cylindrical case having an oval cross section, and the canister is arranged so that the longitudinal direction of the oval cross section of the case is parallel to a cylinder axis of the cylinder block.

In another embodiment, the opposite ends of the support stay extending in the lateral direction of the body frame are mounted on the engine body through first mount rubber elements, and the canister is supported to the central portion of the support stay.

In accordance with one embodiment, any one of the opposite ends of the support stay is integrally formed with a rotation stop fixed to the engine body, thereby functioning to stop the rotation of the support stay.

In one embodiment, a shock absorbing rubber element is mounted on the surface of the canister opposed to the engine body.

In another embodiment, a plurality of mounting plates are fixed to the canister at least three positions to hold the canister from the cylinder block side and the exhaust pipe side. The mounting plates are supported to the support stay.

In accordance with an embodiment, a cover for covering the canister from the exhaust pipe side is supported through second mount rubber elements to the support stay by using bolts used to support the canister.

Another embodiment is directed to a vehicle including body frame means for supporting engine body means mounted on the body frame means. The engine body means for supporting engine components therein. The engine body means includes a crankcase, a cylinder block integral with or joined to the crankcase, and a cylinder head joined to the cylinder block. The vehicle may also include exhaust pipe means for expelling exhaust gas. The exhaust pipe means is connected to the cylinder head, and the exhaust pipe means includes a portion extending along one side surface of the cylinder block. The vehicle further includes fuel tank means for containing fuel, and canister means for purifying an evaporative fuel from said fuel tank means. The canister means is attached to the engine body means, and the canister means is located between the cylinder block and the portion of the exhaust pipe means extending along one side surface of the cylinder block.

Another embodiment is directed to a method including mounting an engine body on a body frame of a vehicle. The engine body includes a crankcase, a cylinder block integral with or joined to the crankcase, and a cylinder head joined to the cylinder block. The method also includes providing an exhaust pipe connected to the cylinder head, the exhaust pipe including a portion extending along one side surface of said cylinder block. The method further includes providing a fuel tank, and attaching a canister to the engine body. The attaching includes attaching the canister at a location between said cylinder block and said portion of said exhaust pipe extending along said one side surface of said cylinder block.

DETAILED DESCRIPTION

Figure 1:
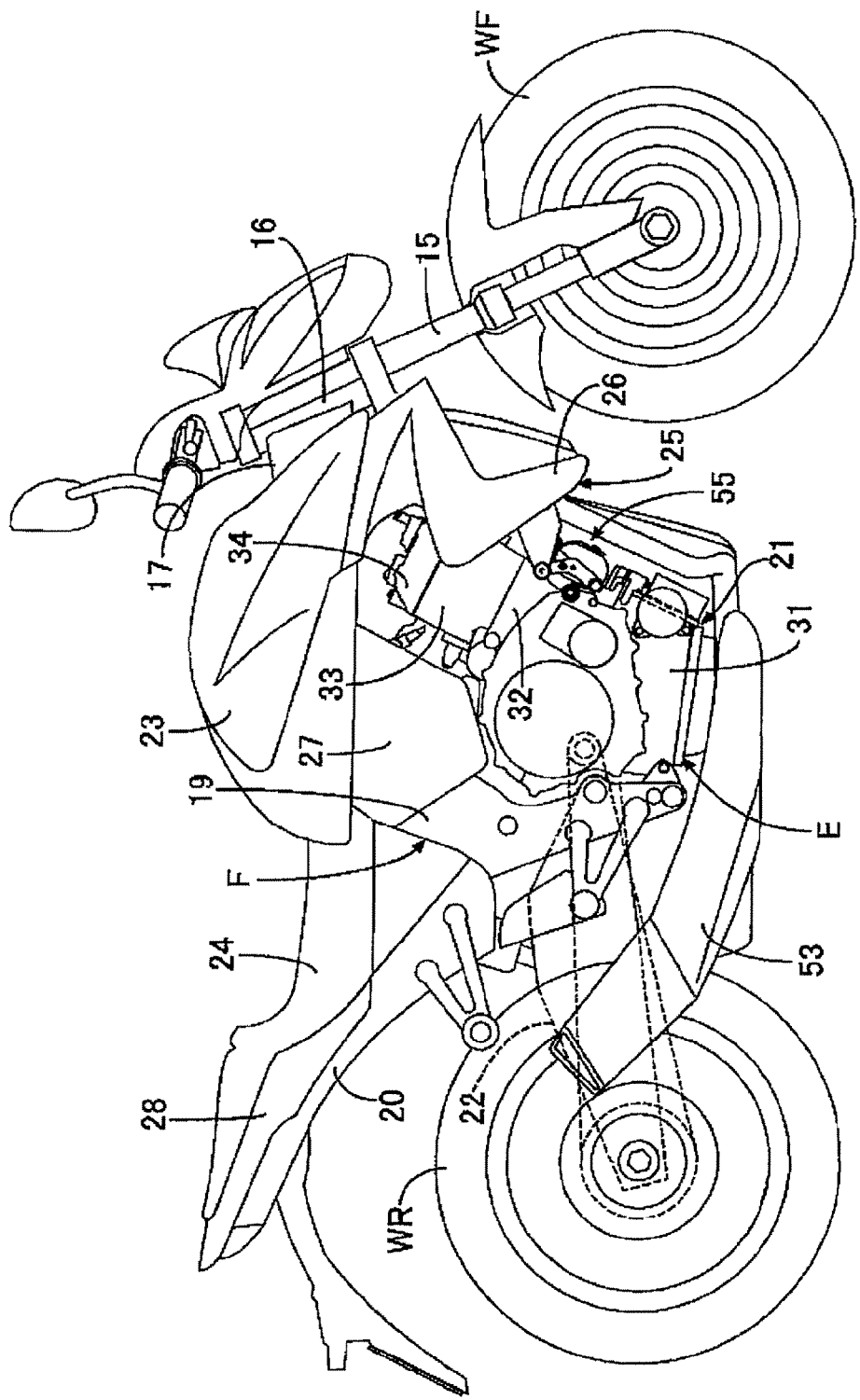
FIG. 1 is a side view of a motorcycle, according to one embodiment.
Figure 2:
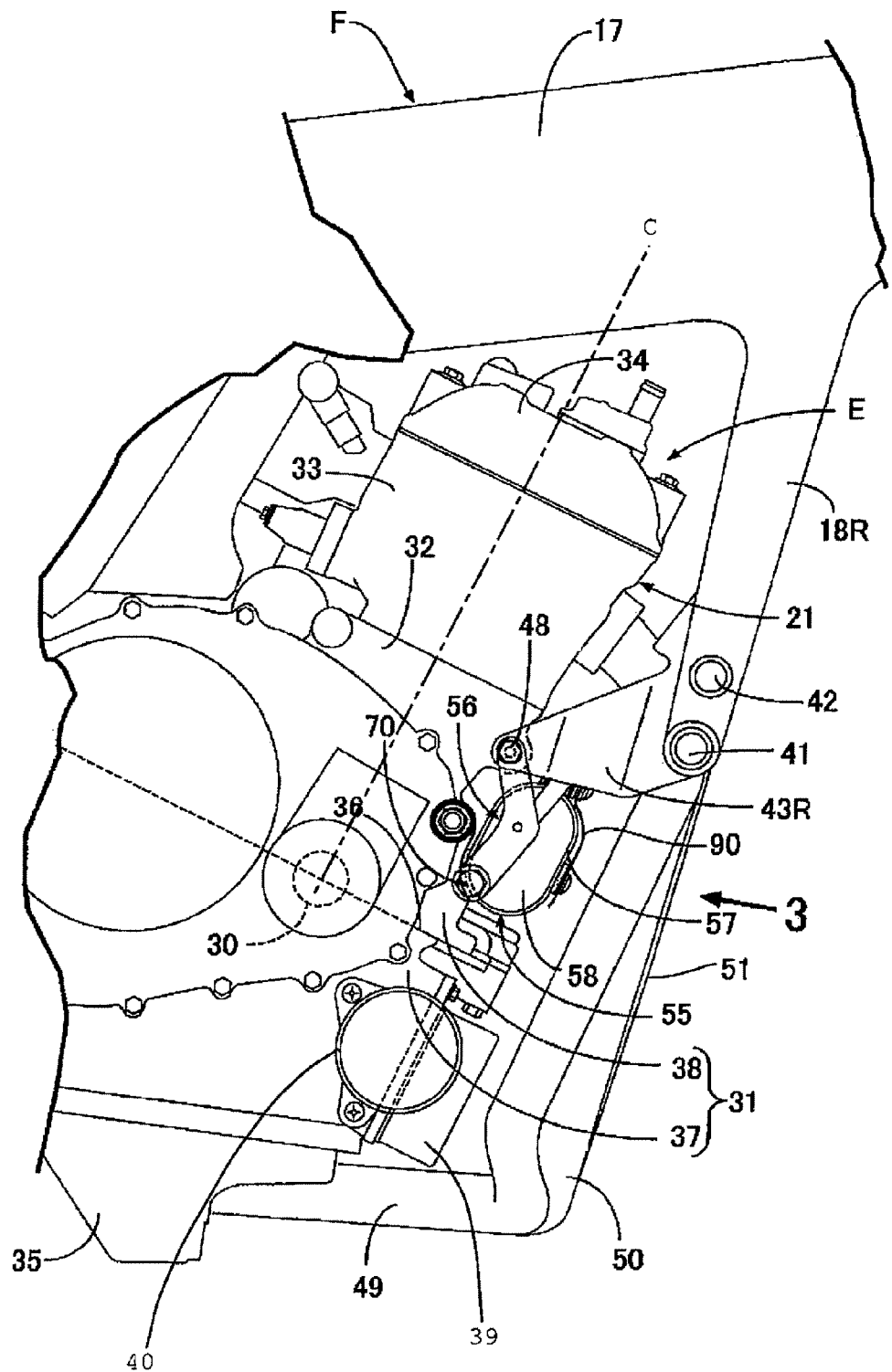
FIG. 2 is an enlarged view of a part of the motorcycle shown in FIG. 1 where a body cover is omitted, according to an embodiment.

An embodiment of the present invention will now be described with reference to FIGS. 1 to 12. Referring first to FIGS. 1 and 2, there is shown a motorcycle as a vehicle having a body frame F. The body frame F includes a head pipe 16 for steerably supporting a front fork 15 that supports a front wheel WF through an axle. A main frame 17 extends rearward from the head pipe 16 so as to be inclined downward. A pair of right and left engine hangers 18R and 18L extend downward from the head pipe 16, a pivot frame 19 extends downward from the rear portion of the main frame 17, and a seat rail 20 extends rearward from the rear portion of the main frame 17 so as to be inclined upward.

According to one embodiment, an engine body 21 of an in-line four-cylinder engine E is supported to the rear portion of the main frame 17, the lower portions of the engine hangers 18R and 18L, and the lower portion of the pivot frame 19 so as to be located below the main frame 17. A swing arm 22 is vertically, swingably supported at its front end portion to the lower portion of the pivot frame 19. A rear wheel WR that may be driven by the power generated from the engine E is supported through an axle to the rear end portion of the swing arm 22. A fuel tank 23 can be mounted on the main frame 17 above the engine E. In some embodiments, a tandem riding seat 24 may be located on the rear side of the fuel tank 23 and supported to the seat rail 20.

In an embodiment, a part of the engine E and a part of the body frame F are covered with a body cover 25. The body cover 25 may include a front cowl 26, a pair of right and left side covers 27 located between the fuel tank 23 and the riding seat 24 so as to cover the right and left sides of the rear lower portion of the fuel tank 23, and a rear cowl 28 extending rearward from the rear portions of the right and left side covers 27 so as to be inclined upward.

Figure 3:
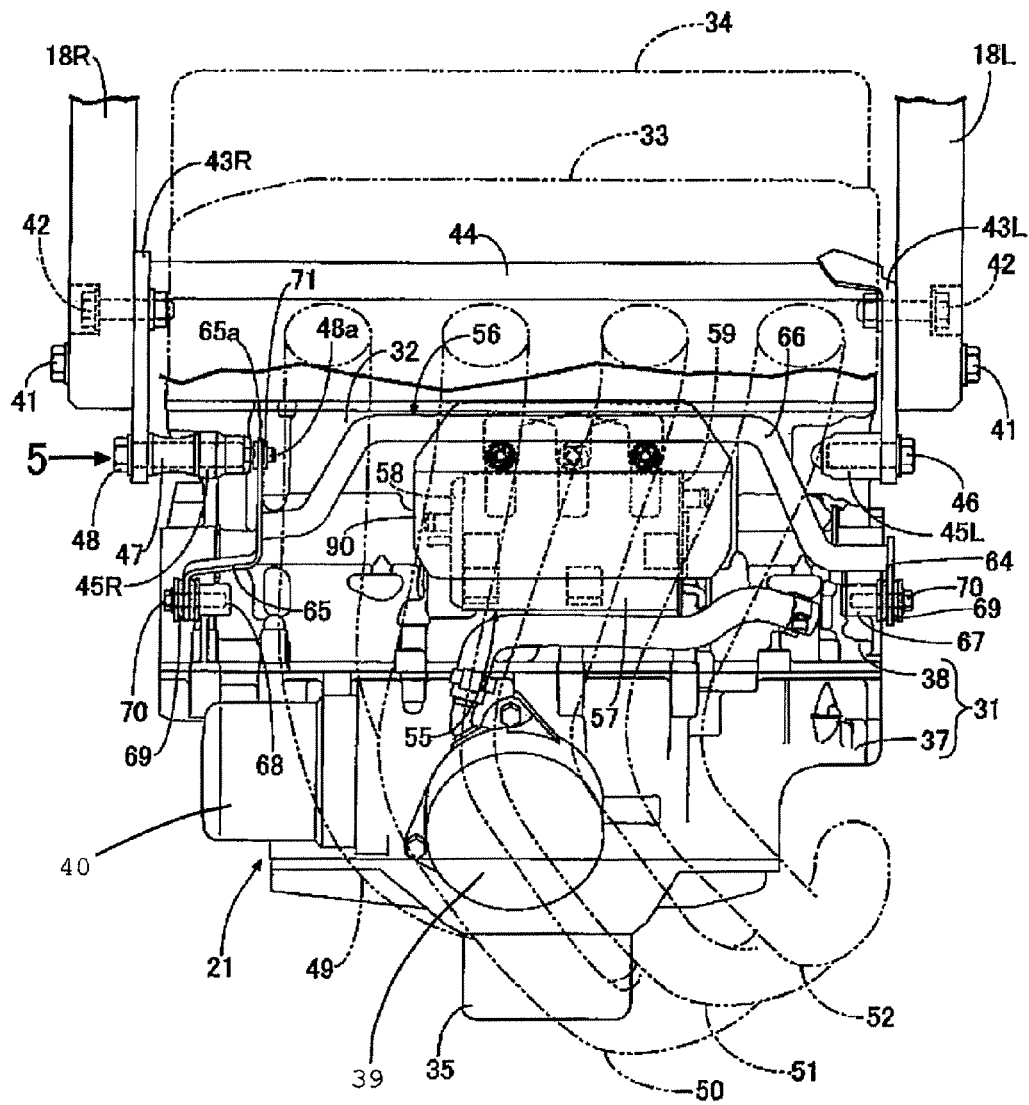
FIG. 3 is a view taken in the direction of an arrow 3 in FIG. 2, according to one embodiment.

Referring to the embodiment illustrated in FIG. 3, the engine body 21 has a crankcase 31 for rotatably supporting a crankshaft 30 having an axis extending in the lateral direction of the body frame F. A cylinder block 32 extends upward from the upper end of the front portion of the crankcase 31 so as to be inclined frontward, a cylinder head 33 is joined to the upper end of the cylinder block 32, and a head cover 34 is joined to the upper end of the cylinder head 33. An oil pan 35 may be joined to the lower portion of the crankcase 31.

According to an embodiment, the crankcase 31 is composed of a lower case half 37 and an upper case half 38 joined together on a joining surface 36 on which the axis of the crankshaft 30 lies. The cylinder block 32 has a cylinder axis C inclined frontward, and the cylinder block 32 may be formed integrally with the upper case half 38 of the crankcase 31. In one embodiment, an oil cooler 39 is mounted on the front surface of the lower case half 37 of the crankcase 31, and an oil filter 40 is mounted on the right surface of the front portion of the lower case half 37.

According to certain embodiments, a left bracket 43L is fixed to the lower portion of the left engine hanger 18L by a pair of bolts 41 and 42, and a right bracket 43R is fixed to the lower portion of the right engine hanger 18R by a pair of bolts 41 and 42. A cross bar 44 extends between the right and left brackets 43R and 43L.

In an embodiment, a boss 45L is formed at the front upper portion of the cylinder block 32 on the left side thereof, and the left bracket 43L is fastened to the boss 45L by a bolt 46. Similarly, in one embodiment, a boss 45R is formed at the front upper portion of the cylinder block 32 on the right side thereof, and the right bracket 43R is fastened to the boss 45R by a bolt 48 with a spacer 47 interposed therebetween.

According to an embodiment of the invention, four exhaust pipes 49, 50, 51, and 52 respectively corresponding to the four cylinders of the engine E are connected at their upstream ends to the front surface of the cylinder head 33 of the engine body 21. Each of these exhaust pipes 49 to 52 has a portion extending along the front surface of the cylinder block 32 and the crankcase 31 as one side surface thereof. The exhaust pipes 49 to 52 further extend rearward below the engine body 21 on the left side of the oil pan 35, and the downstream ends of the exhaust pipes 49 to 52 are connected to an exhaust muffler 53 (see FIG. 1) located on the right side of the rear wheel WR.

Figure 4:
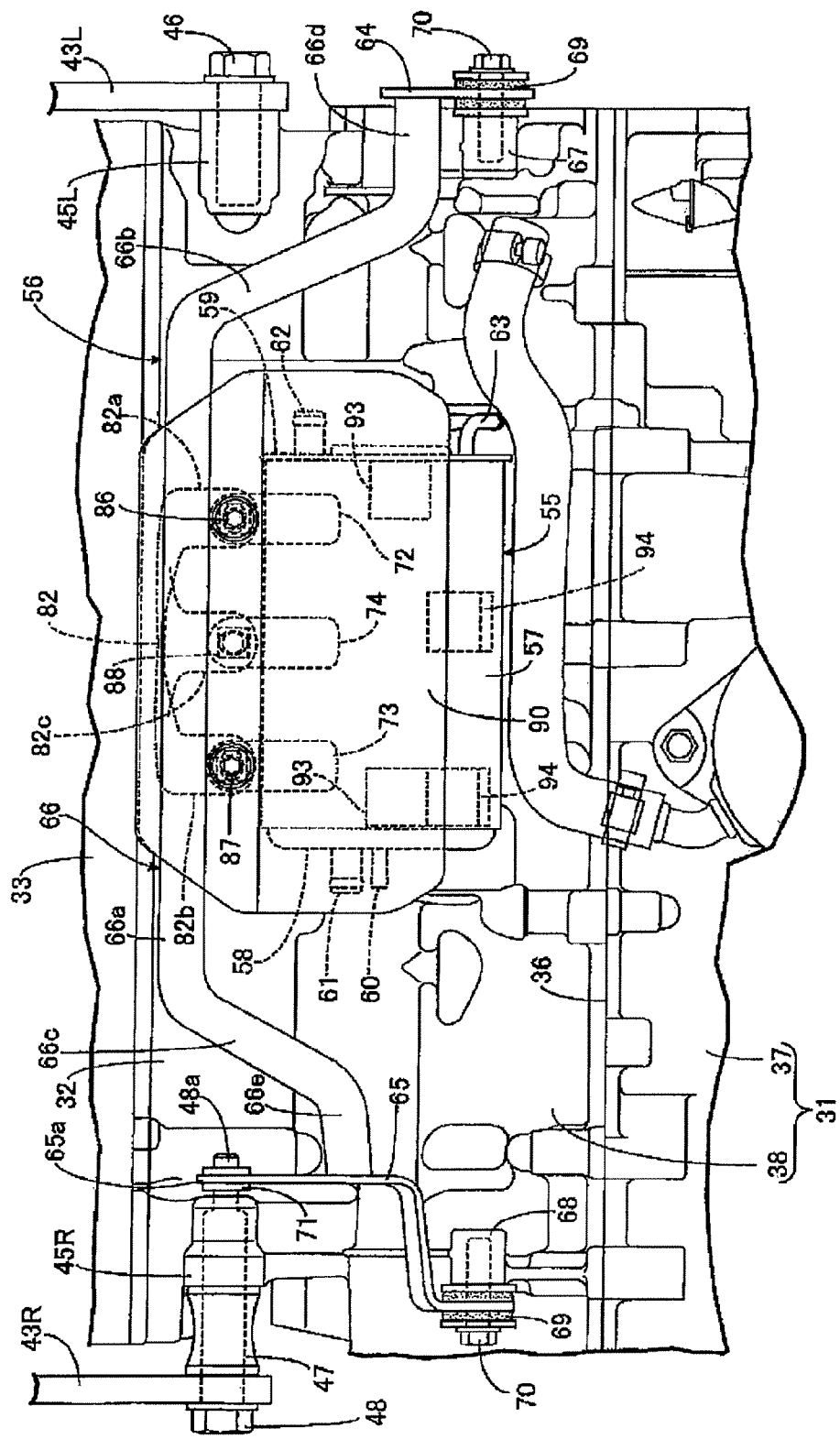
FIG. 4 is an enlarged view of a part in FIG. 3, according to one embodiment.
Figure 5:
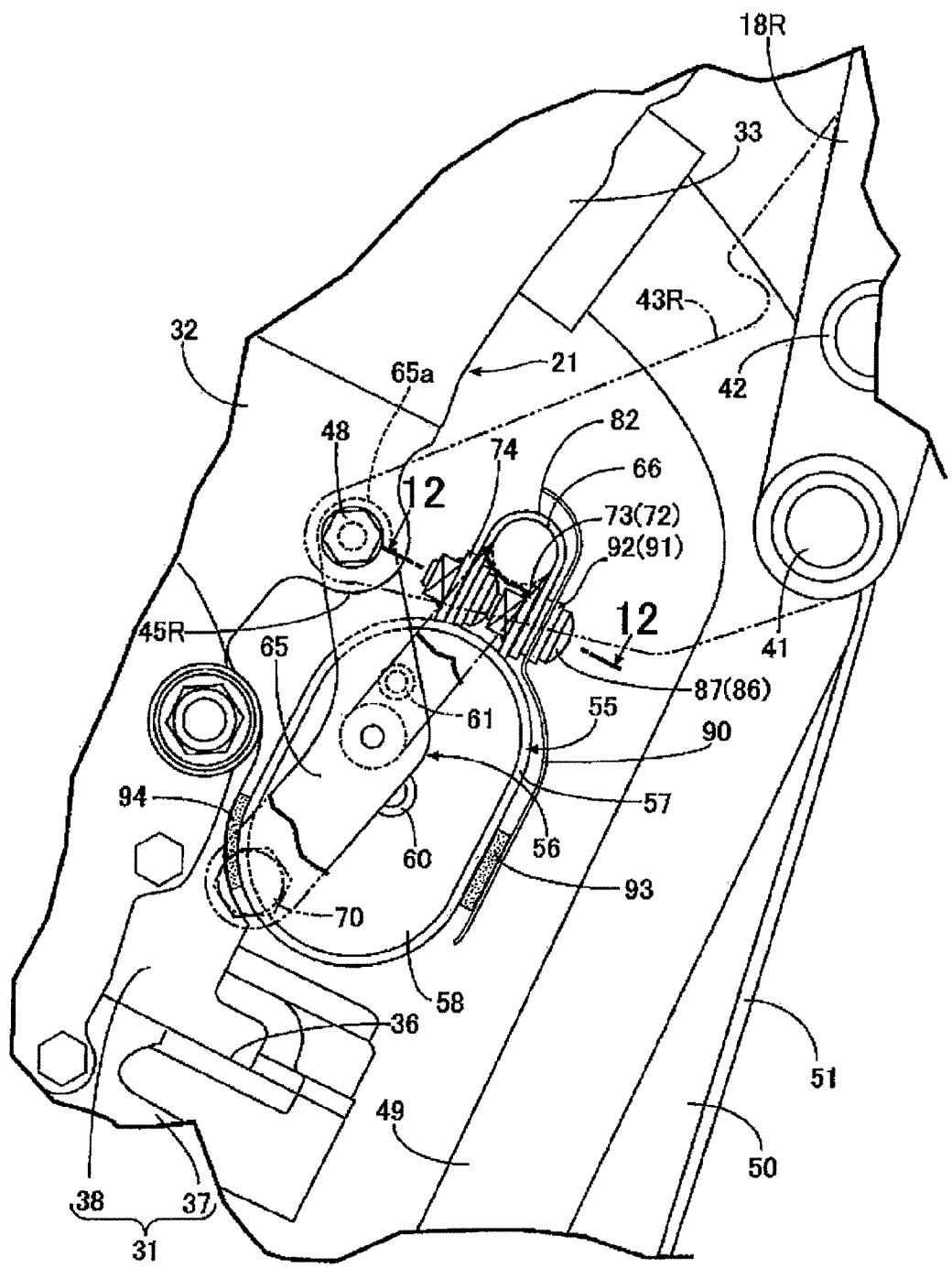
FIG. 5 is an enlarged view taken in the direction of an arrow 5 in FIG. 3, according to one embodiment.

Referring to the embodiments illustrated in FIGS. 4 and 5, a canister 55 for purifying an evaporative fuel from the fuel tank 23 is attached to the engine body 21. According to one embodiment, the canister 55 is located between the cylinder block 32 and a portion of the exhaust pipes 49 to 52 extending along the front surface of the cylinder block 32. A support stay 56 for supporting the canister 55 is mounted on the crankcase 31 and the cylinder block 32 of the engine body 21.

Figure 6:
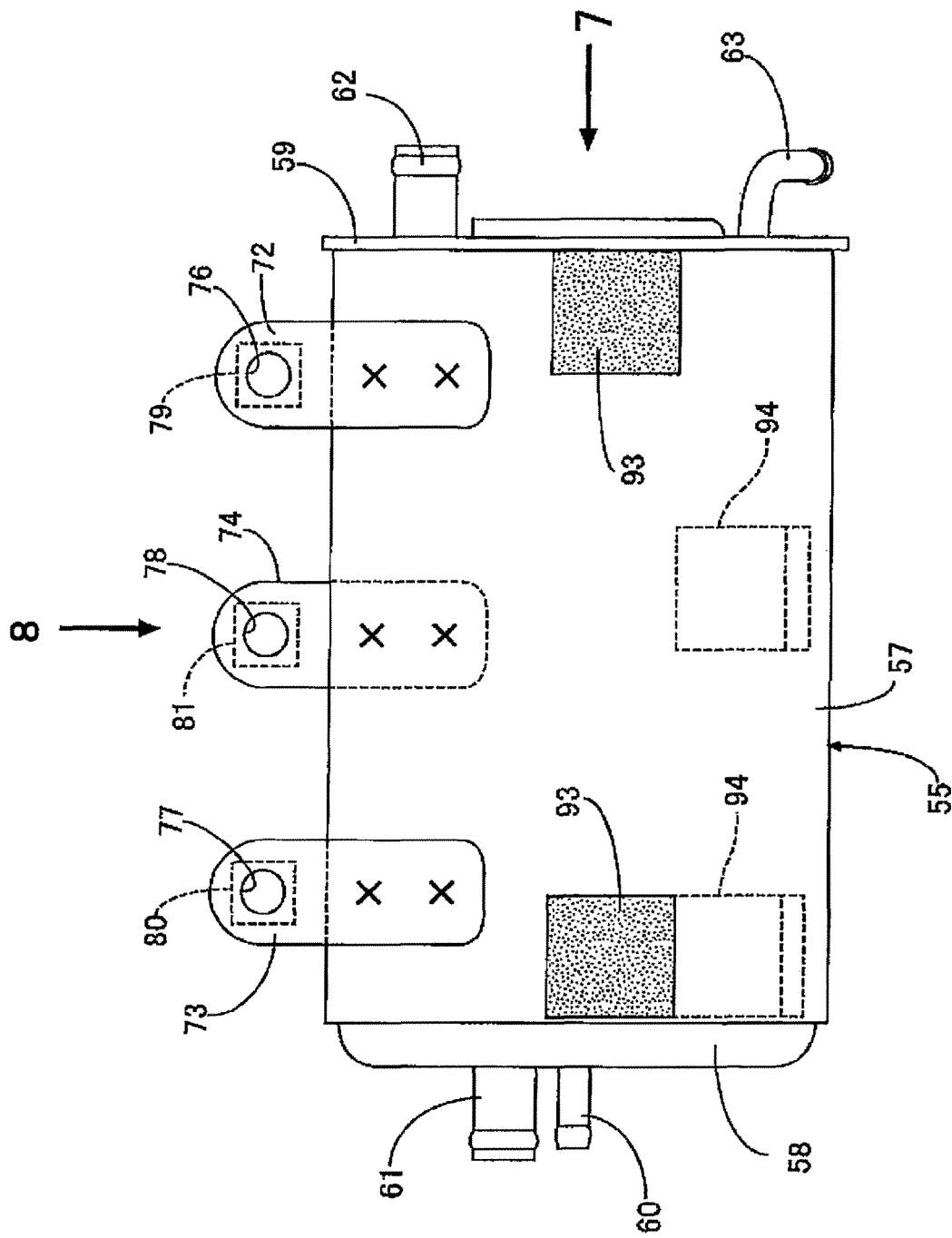
FIG. 6 is a front view of a canister in the condition where a cover is removed as viewed in the same direction as that in FIGS. 3 and 4, according to one embodiment.
Figure 7:
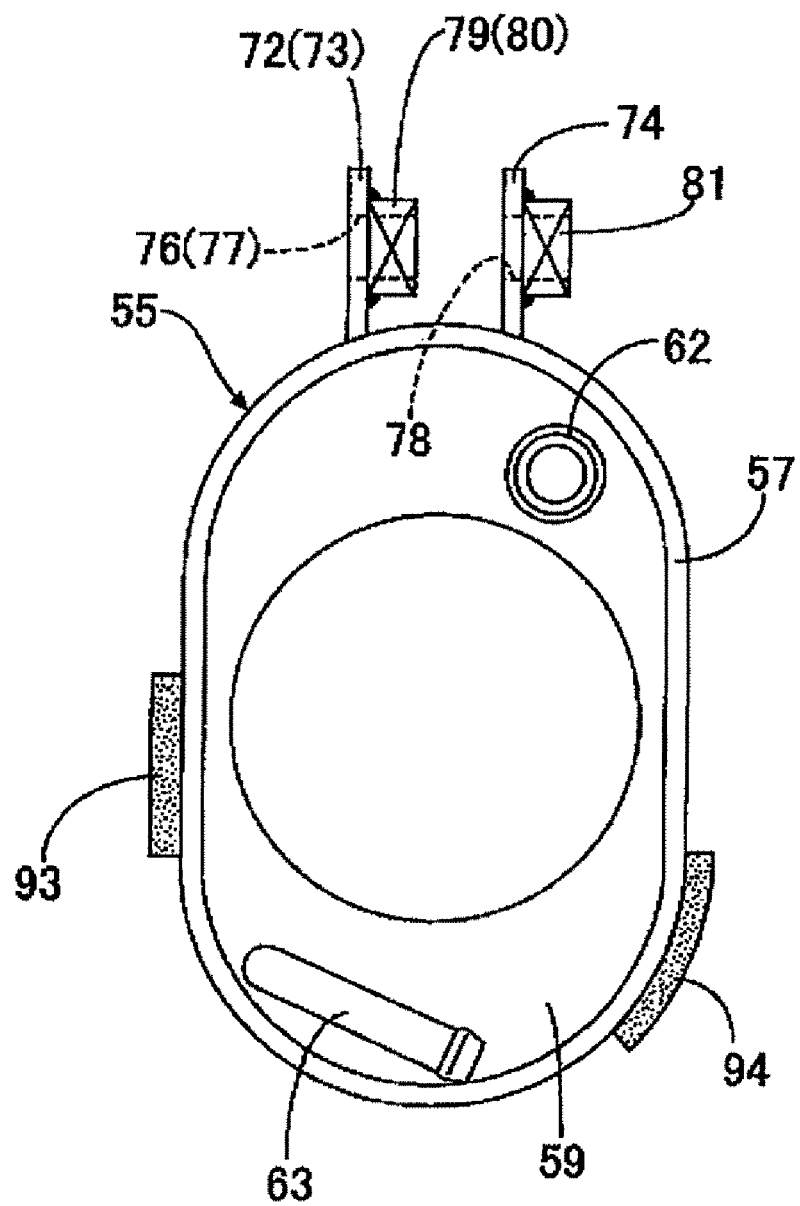
FIG. 7 is a view taken in the direction of an arrow 7 in FIG. 6, according to one embodiment.
Figure 8:
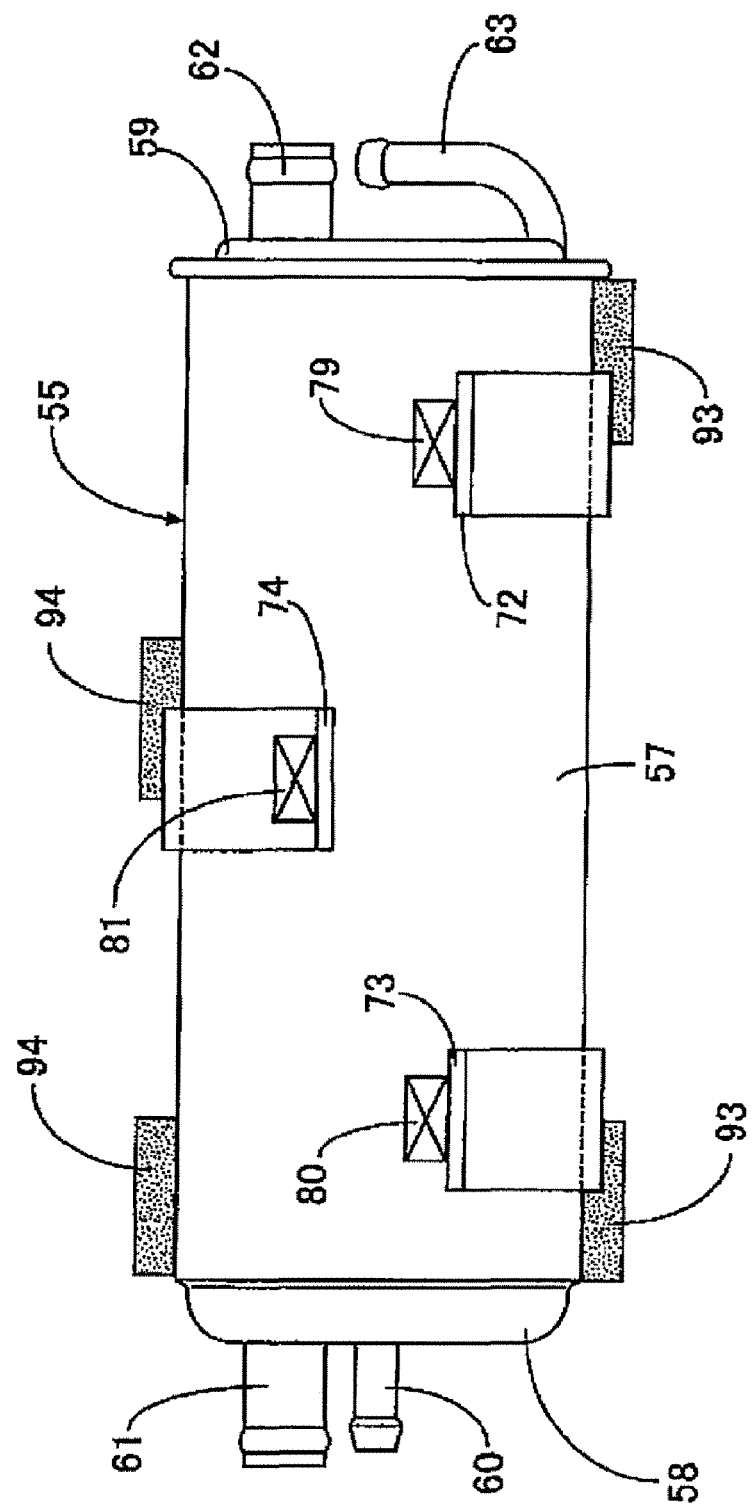
FIG. 8 is a view taken in the direction of an arrow 8 in FIG. 6, according to one embodiment.

Referring to the embodiments illustrated in FIGS. 6 to 8, the canister 55 has a flattened cylindrical case 57 having an oval cross section and extending in the lateral direction of the vehicle. Both ends of the case 57 are closed by end walls 58 and 59. As shown in the embodiments of FIG. 2, the canister 55 may be arranged so that the longitudinal direction of the oval cross section of the case 57 extends parallel to the cylinder axis C of the cylinder block 32.

The right end wall 58 of the case 57 of the canister 55 may be provided with a charging connection pipe 60 for connecting a charge tube for charging a fuel gas evaporated in the fuel tank 23. The right end wall 58 may be further provided with a purging connection pipe 61 for connecting a purge tube for purging the fuel gas collected in the canister 55.

The left end wall 59 of the case 57 of the canister 55 may be provided with an air vent connection pipe 62 for connecting an air vent tube for opening the inside of the canister 55 to the atmospheric air. The left end wall 59 may be further provided with a draining connection pipe 63 for connecting a drain tube for discharging a drain from the canister 55.

Figure 9:
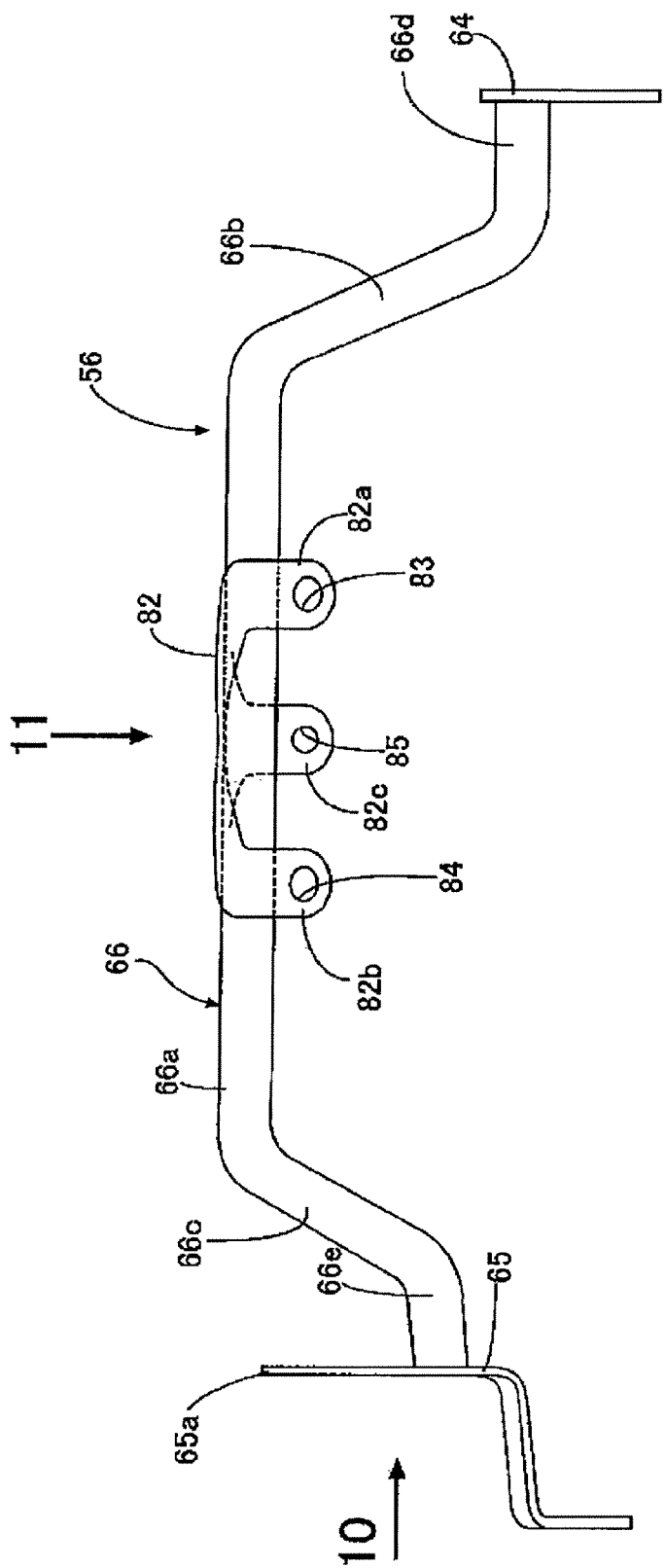
FIG. 9 is a front view of a support stay as viewed in the same direction as that in FIGS. 3 and 4, according to one embodiment.
Figure 10:
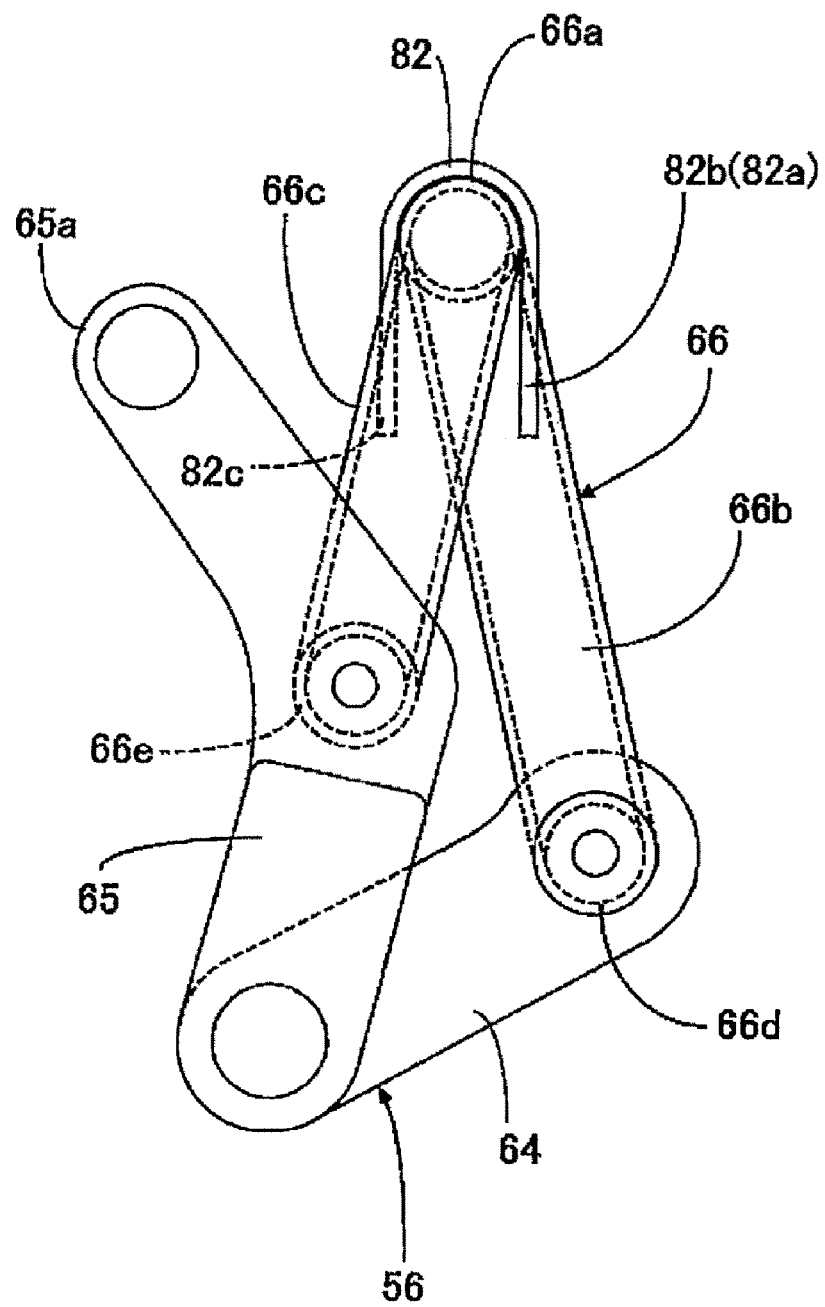
FIG. 10 is an enlarged view taken in the direction of an arrow 10 in FIG. 9, according to one embodiment.

Referring to the embodiments illustrated in FIGS. 9 and 10, the support stay 56 includes a support pipe 66 extending in the lateral direction of the vehicle, a left support plate 64 connected to the left end of the support pipe 66, and a right support plate 65 connected to the right end of the support pipe 66.

According to one embodiment, the front portion of the upper case half 38 of the crankcase 31 of the engine body 21 is formed with a cylindrical left boss 67 for mounting the left support plate 64 and a cylindrical right boss 68 for mounting the right support plate 65. Bosses 67 and 68 may be coaxially formed so as to be opposed to the inside surfaces of the support plates 64 and 65, respectively. The left support plate 64 can be mounted on the left boss 67 by a bolt 70 with a mount rubber element 69 interposed therebetween. Similarly, the right support plate 65 can be mounted on the right boss 68 by a bolt 70 with a mount rubber element 69 interposed therebetween. In other words, according to an embodiment, the opposite ends of the support stay 56 extending in the lateral direction of the body frame F are mounted through the mount rubber elements 69 to the crankcase 31 of the engine body 21.

In one embodiment, the left support plate 64 is supported at its lower end portion through the mount rubber element 69 to the left boss 67 and extends frontward so as to be inclined upward. The right support plate 65 is bent at its intermediate portion so that this portion projects frontward as viewed in side elevation. The right support plate 65 is also supported at its lower end portion through the mount rubber element 69 to the right boss 68.

According to one embodiment, the support pipe 66 is an integral member formed by bending a pipe material. The support pipe 66 has a horizontal supporting portion 66a extending horizontally in the lateral direction of the body frame F above the canister 55, and a left inclined portion 66b extending downward from the left end of the horizontal supporting portion 66a so as to be inclined frontward as shown in FIG. 10. The support pipe 66 also has a right inclined portion 66c extending downward from the right end of the horizontal supporting portion 66a so as to be inclined rearward as shown in FIG. 10, a left horizontal connecting portion 66d extending horizontally from the lower end of the left inclined portion 66b to the left support plate 64, and a right horizontal connecting portion 66e extending horizontally from the lower end of the right inclined portion 66c to the right support plate 65. The left horizontal connecting portion 66d is connected to the upper portion of the left support plate 64 at right angles thereto, and the right horizontal connecting portion 66e is connected to the intermediate portion of the right support plate 65 at right angles thereto. As shown in FIG. 10, according to an embodiment, the left inclined portion 66b and the right inclined portion 66c extend from the horizontal supporting portion 66a so as to be bent in opposite directions. Thus, the support pipe 66 is bent asymmetrically as viewed in plan.

Any one of the opposite ends of the support stay 56, specifically, in one embodiment, the right support plate 65 provided at the right end of the support stay 56 is integrally formed with a rotation stop 65a fixed to the cylinder block 32 of the engine body 21, thereby functioning to stop the rotation of the support stay 56. More specifically, in an embodiment, the rotation stop 65a is formed at the upper end portion of the right support plate 65.

As mentioned above, according to an embodiment, the right bracket 43R is fastened to the lower portion of the right engine hanger 18R of the body frame F. In an embodiment, the right bracket 43R is further fastened to the boss 45R formed at the front portion of the cylinder block 32 by the bolt 48 with the spacer 47 interposed between the boss 45R and the bracket 43R. The bolt 48 may be integrally and coaxially formed with an engaging shaft portion 48a projecting laterally inward from the boss 45R. The rotation stop 65a formed at the upper end portion of the right support plate 65 may be engaged with the engaging shaft portion 48a through a mount rubber element 71.

According to one embodiment, the canister 55 is supported to the central portion of the support stay 56, i.e., the central portion of the horizontal supporting portion 66a of the support pipe 66. A plurality of mounting plates 72, 73, and 74 may be fixed to the canister 55 at least three positions holding the canister 55 from the cylinder block 32 side and the exhaust pipes 49 to 52 side. More specifically, in this embodiment, the three mounting plates 72, 73, and 74 are fixed to the case 57 of the canister 55 at such three positions on the upper surface of the case 57. The mounting plates 72 to 74 are supported to the support stay 56.

According to certain embodiments, the mounting plates 72 and 73 are spaced from each other in the direction along the axis of the case 57 and welded to the upper portion of the front surface of the case 57 so as to project upward from the case 57.

On the other hand, in an embodiment, the mounting plate 74 is located centrally between the mounting plates 72 and 73 as viewed in front elevation (FIG. 6) and welded to the upper portion of the rear surface of the case 57 so as to project upward from the case 57.

In an embodiment, the upper portions of the mounting plates 72, 73, and 74 are formed with through holes 76, 77, and 78, respectively. Weld nuts 79, 80, and 81 respectively corresponding to the through holes 76, 77, and 78 may be fixed to the rear surfaces of the upper portions of the mounting plates 72, 73, and 74, respectively.

Figure 11:
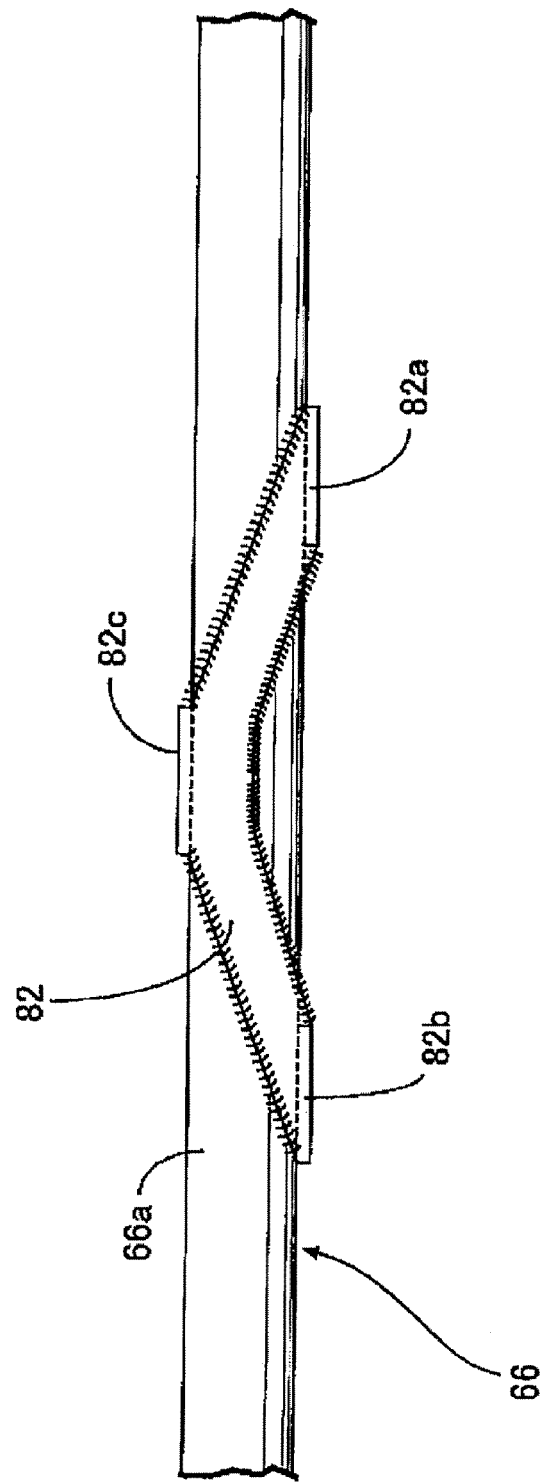
FIG. 11 is an enlarged view taken in the direction of an arrow 11 in FIG. 9, according to one embodiment.
Figure 12:
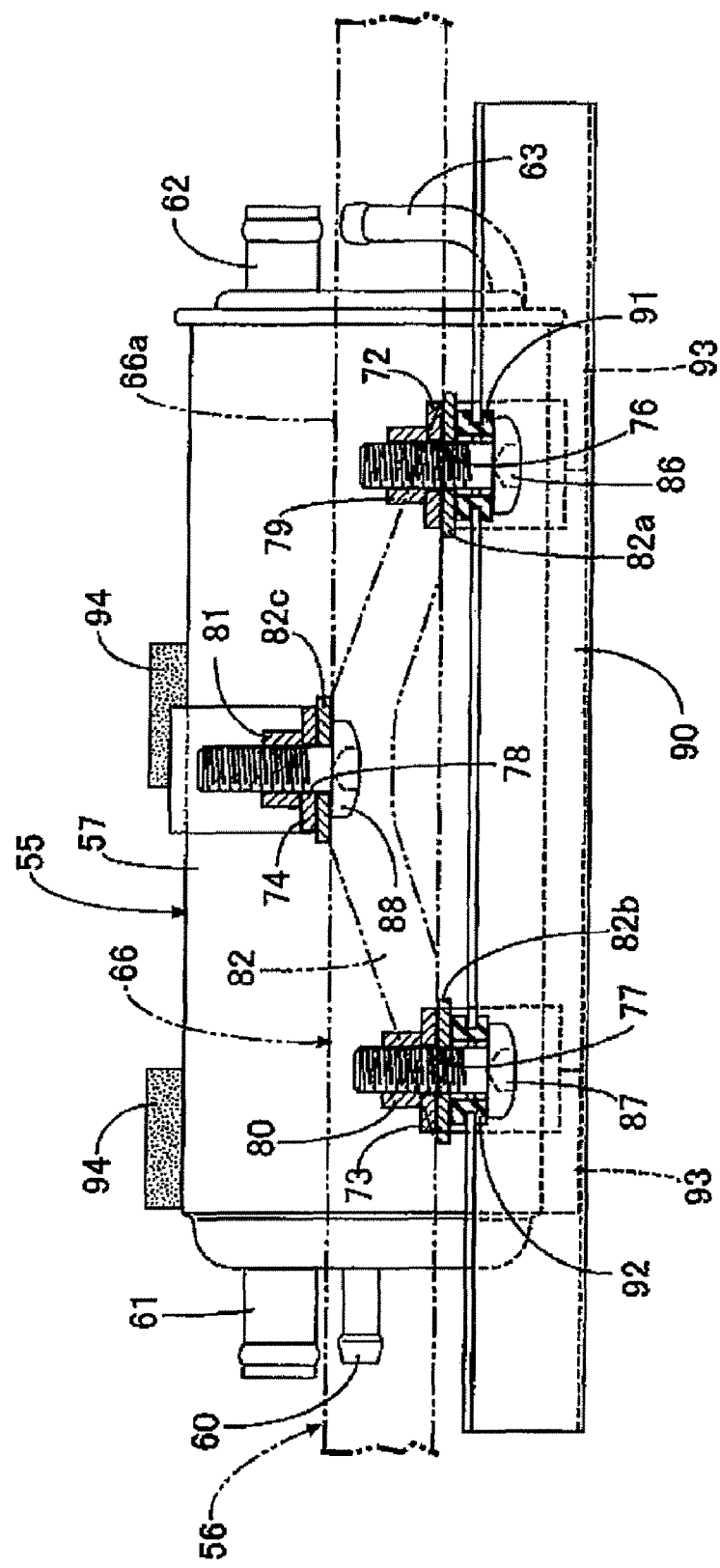
FIG. 12 is a cross section taken along the line 12-12 in FIG. 5, according to one embodiment.

Referring to the embodiments illustrated in FIGS. 11 and 12, a central support plate 82 as a part of the support stay 56 is welded to the central portion of the horizontal supporting portion 66a of the support pipe 66 of the support stay 56. The central support plate 82 is integrally formed with three supporting plate portions 82a, 82b, and 82c pending from the horizontal supporting portion 66a. The supporting plate portions 82a, 82b, and 82c abut against the front surfaces of the upper portions of the mounting plates 72, 73, and 74 fixed to the case 57 of the canister 55, respectively. The supporting plate portions 82a, 82b, and 82c are respectively formed with through holes 83, 84, and 85 respectively corresponding to the through holes 76, 77, and 78 of the mounting plates 72, 73, and 74. The through holes 83 and 84 of the supporting plate portions 82a and 82b are elongated in the longitudinal direction of the horizontal supporting portion 66a, i.e., in the direction along the axis of the canister 55.

According to one embodiment, bolts 86, 87, and 88 are inserted through the through holes 83, 84, and 85 of the supporting plate portions 82a, 82b, and 82c and the through holes 76, 77, and 78 of the mounting plates 72, 73, and 74, respectively, and then tightly engaged with the weld nuts 79, 80, and 81, respectively. Thus, the canister 55 is attached to the central portion of the support stay 56.

The canister 55 may be covered with a cover 90 on the front side opposed to the exhaust pipes 49 to 52. In one embodiment, the cover 90 is supported through mount rubber elements 91 and 92 to the support stay 56. More specifically, the cover 90 can be attached to the support stay 56 by using the two bolts 86 and 87 of the three bolts 86, 87, and 88 used to attach the canister 55 to the support stay 56. The two bolts 86 and 87 can be inserted through the mount rubber elements 91 and 92 mounted on the cover 90, the through holes 85 and 86 of the supporting plate portions 82a and 82b, and the through holes 76 and 77 of the mounting plates 72 and 73 and then engaged with the weld units 79 and 80, respectively.

According to one embodiment, a pair of shock absorbing rubber elements 93 are mounted by bonding or the like on the front surface of the case 57 of the canister 55 so as to be interposed between the case 57 and the cover 90. Similarly, in an embodiment, a pair of shock absorbing rubber elements 94 are mounted by bonding or the like on the rear surface of the case 57 of the canister 55, i.e., on the surface opposed to the crankcase 31 of the engine body 21.

The operation of the above embodiments will now be described. The exhaust pipes 49 to 52, which each have a portion extending along the front surface of the cylinder block 32, are connected to the cylinder head 33 of the engine body 21 mounted on the body frame F. The canister 55, which is attached to the engine body 21, is located between the cylinder block 32 and the portion of the exhaust pipes 49 to 52 extending along the front surface of the cylinder block 32. With this arrangement, the canister 55 can be located by effectively utilizing the space between the cylinder block 32 and the exhaust pipes 49 to 52 in a way such that the mutual influence of the exhaust pipes 49 to 52 and the canister 55 is avoided.

In an embodiment as discussed above, the canister 55 is supported to the support stay 56 mounted on the engine body 21. Accordingly, an increase in the size of the support stay 56 can be avoided, and the support stay 56 can be made smaller in size.

In one embodiment as discussed above, the canister 55 includes the flattened cylindrical case 57 having an oval cross section, and the canister 55 is arranged so that the longitudinal direction of the oval cross section of the case 57 is parallel to the cylinder axis C of the cylinder block 32. With this arrangement, the space between the cylinder block 32 and the portion of the exhaust pipes 49 to 52 extending along the front surface of the cylinder block 32 can be reduced, so that an increase in the size of the motorcycle can be suppressed.

According to an embodiment as discussed above, the opposite ends of the support stay 56 extending in the lateral direction of the body frame F are mounted on the crankcase 31 of the engine body 21 through the mount rubber elements 69, and the canister 55 is attached to the central portion of the support stay 56. Accordingly, the supporting rigidity of the canister 55 can be improved and the resonance of the canister 55 due to the vibrations of the engine body 21 can be prevented.

In an embodiment as discussed above, any one of the opposite ends of the support stay 56 is integrally formed with the rotation stop 65a fixed to the cylinder block 32 of the engine body 21, thereby functioning to stop the rotation of the support stay 56. Accordingly, a mounting structure of the opposite ends of the support stay 56 to the engine body 21 can be simplified and the supporting rigidity of the canister 55 by the support stay 56 can be improved.

According to an embodiment as discussed above, the shock absorbing rubber elements 94 are mounted on the surface of the canister 55 opposed to the engine body 21. Accordingly, an impact noise due to the contact of the canister 55 with the engine body 21 can be reduced and the canister 55 can be located closer to the engine body 21.

In an embodiment as discussed above, the mounting plates 72, 73, and 74 are fixed to the case 57 of the canister 55 at least three positions holding the canister 55 from the cylinder block 32 side and the exhaust pipes 49 to 52 side, and the mounting plates 72 to 74 are supported to the support stay 56. Accordingly, the transmission of vibrations from the engine body 21 to the canister 55 can be suppressed and the canister 55 can be firmly supported by the support stay 56.

In one embodiment as discussed above, the cover 90, which covers the canister 55 from the exhaust pipes 49 to 52 side, is supported through the mount rubber elements 91 and 92 to the support stay 56. Accordingly, the resonance of the cover 90 due to the vibrations of the engine body 21 can be suppressed. Further, in an embodiment, the cover 90 is supported through the mount rubber elements 91 and 92 to the support stay 56 by using the bolts 86 and 87 also used to support the canister 55. Accordingly, any mounting members such as bolts dedicated to the cover 90 are not required, thereby contributing to a reduction in the number of parts.

Having thus described certain embodiments of the present invention, it should be noted that the present invention is not limited to the above embodiments. Various modifications may be made without departing from the scope of the present invention as claimed.

For example, while the cylinder block 32 may be integral with the upper case half 38 forming a part of the crankcase 31 in the above embodiments, a separate cylinder block may be joined to a crankcase according to other embodiments.

DESCRIPTION OF THE REFERENCE SYMBOLS

21: Engine body
23: Fuel tank
31: Crankcase
32: Cylinder block
33: Cylinder head
49, 50, 51, 52: Exhaust pipe
55: Canister
56: Support stay
57: Case
65a: Rotation stop
69, 91, 92: Mount rubber elements
72, 73, 74: Mounting plate
86, 87: Bolt
94: Shock absorbing rubber element
C: Cylinder axis
F: Body frame

We claim:

1. A vehicle, comprising:
a body frame;
an engine body mounted on said body frame, said engine body comprising a crankcase, a cylinder block integral with or joined to said crankcase, and a cylinder head joined to said cylinder block;
an exhaust pipe connected to said cylinder head, said exhaust pipe comprising a portion extending along one side surface of said cylinder block;
a fuel tank; and
a canister attached to said engine body, for the canister configured to purify an evaporative fuel from said fuel tank, wherein the canister is located between said cylinder block and said portion of said exhaust pipe extending along said one side surface of said cylinder block.

2. The vehicle according to claim 1, wherein a support stay configured to support said canister is mounted on said engine body.

3. The vehicle according to claim 1, wherein said canister comprises a flattened cylindrical case having an oval cross section, and said canister is configured such that a longitudinal direction of said oval cross section of said case is parallel to a cylinder axis of said cylinder block.

4. The vehicle according to claim 2, wherein the opposite ends of said support stay extending in the lateral direction of said body frame are mounted on said engine body through first mount rubber elements, and said canister is attached to the central portion of said support stay.

5. The vehicle according to claim 4, wherein any one of the opposite ends of said support stay is integrally formed with a rotation stop fixed to said engine body, thereby functioning to stop the rotation of said support stay.

6. The vehicle according to claim 1, further comprising a shock absorbing rubber mounted on the surface of said canister opposed to said engine body.

7. The vehicle according to claim 2, wherein a plurality of mounting plates are fixed to said canister at at least three positions holding said canister from said cylinder block side and said exhaust pipe side, and said mounting plates are attached to said support stay.

8. The vehicle according to claim 2, wherein a cover configured to cover said canister from said exhaust pipe side is supported through second mount rubber elements to said support stay by using bolts used to support said canister.

9. A vehicle, comprising:
body frame means for supporting engine body means mounted on the body frame means, said engine body means for supporting engine components therein, said engine body means comprising a crankcase, a cylinder block integral with or joined to said crankcase, and a cylinder head joined to said cylinder block;
exhaust pipe means for expelling exhaust gas, the exhaust pipe means connected to said cylinder head, said exhaust pipe means comprising a portion extending along one side surface of said cylinder block;
fuel tank means for containing fuel; and
canister means for purifying an evaporative fuel from said fuel tank means, wherein the canister means is attached to said engine body means, and wherein the canister means is located between said cylinder block and said portion of said exhaust pipe means extending along said one side surface of said cylinder block.

10. The vehicle according to claim 9, further comprising support stay means for supporting said canister means, the support stay means mounted on said engine body means.

11. The vehicle according to claim 9, wherein said canister means comprises a flattened cylindrical case having an oval cross section, and said canister means is arranged so that a longitudinal direction of said oval cross section of said case is parallel to a cylinder axis of said cylinder block.

12. The vehicle according to claim 10, wherein the opposite ends of said support stay means extend in the lateral direction of said body frame means and are mounted on said engine body means through first absorbing means, and said canister means is attached to the central portion of said support stay means.

13. The vehicle according to claim 9, further comprising absorbing means for absorbing shock, the absorbing means mounted on the surface of said canister means opposed to said engine body means.

14. The vehicle according to claim 10, wherein holding means for holding the canister means are fixed to the canister means at least three positions, the holding means holding said canister from said cylinder block side and said exhaust pipe means side, and said holding means are attached to said support stay means.

15. A method, comprising:
mounting an engine body on a body frame of a vehicle, said engine body comprising a crankcase, a cylinder block integral with or joined to said crankcase, and a cylinder head joined to said cylinder block;
providing an exhaust pipe connected to said cylinder head, said exhaust pipe comprising a portion extending along one side surface of said cylinder block;
providing a fuel tank; and
attaching a canister to said engine body, wherein the attaching comprises attaching the canister at a location between said cylinder block and said portion of said exhaust pipe extending along said one side surface of said cylinder block.

16. The method according to claim 15, further comprising support said canister by a support stay mounted on said engine body.

17. The method according to claim 15, wherein said canister has a flattened cylindrical case having an oval cross section, and the method further comprises arranging said canister so that a longitudinal direction of said oval cross section of said case is parallel to a cylinder axis of said cylinder block.

18. The method according to claim 16, further comprising mounting opposite ends of said support stay extending in the lateral direction of said body frame on said engine body through first mount rubber elements, and attaching said canister to the central portion of said support stay.

19. The method according to claim 18, further comprising stopping the rotation of said support stay by integrally forming any one of the opposite ends of said support stay with a rotation stop fixed to said engine body.

20. The method according to claim 15, further comprising mounting a shock absorbing rubber element on the surface of said canister opposed to said engine body.

* * * * *